United States Patent [19]

Dixon et al.

[11] Patent Number: 5,292,409
[45] Date of Patent: Mar. 8, 1994

[54] CATHODE AND PROCESS FOR DEGRADING HALOGENATED CARBON COMPOUNDS IN AQUEOUS SOLVENTS

[75] Inventors: Brian G. Dixon, Sandwich; Leah J. Bialic, Walpole, both of Mass.

[73] Assignee: Cape Cod Research, Inc., East Falmouth, Mass.

[21] Appl. No.: 806,779

[22] Filed: Dec. 12, 1991

Related U.S. Application Data

[63] Continuation-in-part of Ser. No. 506,798, Apr. 10, 1990, abandoned.

[51] Int. Cl.$^5$ ................................................. C25F 5/00
[52] U.S. Cl. ........................................ 204/130; 204/131; 204/290 R; 204/290 F
[58] Field of Search ............. 204/128, 129, 131, 136, 204/149, 283, 284, 290 R, 290 F, 291, 294, 130; 429/30, 33, 40, 43

[56] References Cited

U.S. PATENT DOCUMENTS

| | | | |
|---|---|---|---|
| 4,101,395 | 7/1978 | Motani et al. | 204/290 R |
| 4,410,402 | 10/1983 | Sawyer et al. | 204/59 R |
| 4,468,297 | 8/1984 | Sawyer et al. | 204/59 R |
| 4,801,359 | 1/1989 | Jeanne et al. | 204/129 |
| 4,804,592 | 2/1989 | Vanderborgh et al. | 204/283 |

OTHER PUBLICATIONS

Sawyer et al., "Electrochemical Reduction of Dioxygen to Perhydroxyl in Aprotic Solvents that Contain Bronsted Acids", Anal. Chem., vol. 58, 1986, pp. 1057–1062.

Primary Examiner—Kathryn Gorgos

[57] ABSTRACT

Aqueous solutions of halogenated carbon compounds containing at least one halogen atom and capable of undergoing nucleophilic substitution are degraded by electrolytically generating superoxide ion under the protection of a layer of ion exchange material.

11 Claims, No Drawings

CATHODE AND PROCESS FOR DEGRADING HALOGENATED CARBON COMPOUNDS IN AQUEOUS SOLVENTS

BACKGROUND OF THE INVENTION

This invention was made with Government support under Grant ISI-8860957 awarded by the National Science Foundation. The Government has certain rights in this invention.

This is a division of Ser. No. 07/506,798, filed Apr. 10, 1990, now abandoned.

The invention relates to a novel cathode and process for electrochemical degradation of halogenated carbon compounds dissolved or suspended in aqueous solvents. It relates especially to a cathode which can be used in the purification of water containing priority pollutants.

Polyhalogenated aromatic hydrocarbons were extensively used as transformer oils and heat-exchanger fluids since 1929. These materials are now major components of the hazardous waste disposal problem faced by the Nation. Their long environmental life has led to the contamination of lakes, rivers, coastal estuaries, and groundwater.

The invention relates to an efficient, safe means to degrade halogenated carbon compounds by employing superoxide ion produced electrochemically within the protection of a layered cathode.

Superoxide ion formed electrochemically by the one electron reduction of oxygen is well recognized for its ability to rapidly and completely degrade hazardous polyhalogenated hydrocarbons to oxygenated products and halide ions. However, all prior art cathodes are incapable of efficiently purifying water contaminated with low levels of halogenated aromatic molecules (see U.S. Pat. No. 4,468,297 and U.S. Pat. No. 4,410,402). The prior art requires that superoxide ion be formed in or added to an aprotic solvent which is essentially free of water. (see e.g. Sawyer et al, "Electrochemical Reduction of Dioxygen to Perhydroxyl in Aprotic Solvents That Contain Bronsted Acids", *Anal. Chem.*, Vol. 58, 1986, pp. 1057–1062).

Many halogenated carbon wastes include water. Drying the solution can be prohibitively expensive, especially when the waste is present at levels of less than 1%. Accordingly, there is a clear need for an efficient and safe process for degrading toxic halogenated waste containing water.

SUMMARY OF THE INVENTION

This cathode belongs to the group of activated cathodes which are obtained by coating a cathodic substrate by means of various activating materials, essentially aimed at improving the yield and stability of superoxide ion ($O_2-$) in the presence of by volume from about 1 to about 99 percent water. In accordance with the present invention, a process is provided which overcomes the foregoing problem and in particular is one which appears to fly in the face of the limitation of aprotic solvents. Surprisingly, the invention provides a new cathode, which can be used especially in the electrolysis of aqueous solutions or suspensions of hazardous halogenated organic materials and which is capable, in the presence of dissolved oxygen, of converting said hazardous compounds into benign products.

Briefly, the cathode for water treatment according to the present invention comprises an electrically conducting substrate having thereon an intermediate layer containing an electrode active substance having electrochemical activity for the reduction of oxygen to superoxide ion and an outer layer comprising ion exchange groups.

The invention also comprises the process for the degradation of halogenated carbon compounds as hereinafter set forth.

DETAILED DESCRIPTION

As used herein, the term "superoxide catalyst" denotes one or more electrocatalysts which favor the generation of superoxide ion rather than direct oxygen reduction to peroxide. By way of example but not by way of limitation, graphite, most carbons, gold, mercury, most oxide covered metals (e.g., Ni, Co), most spinels, and transition metal macrocyclics (e.g., cobalt tetraazaannulene) are useful for forming superoxide catalyst. Especially preferred are high surface area graphite, cobalt tetraazaannulene, cobalt tetramethoxyphenyl porphyrin, and ruthenium trisbipyridyl. Catalysts not useful for forming superoxide catalyst are platinum, platinum alloys, platinum family metals, silver, some perovskites, pyrochlores (e.g., lead ruthenate), and some iron transition metal macrocyclics. These materials tend to favor oxygen reduction directly to peroxide or water. The term "covering power" denotes the ratio (R) between the projected surface of the ion exchange layer and the projected surface of the superoxide catalyst. The term "high covering power" denotes a ratio R greater than 95%. It should be understood that although the present invention provides for some degradation of halogenated carbon compounds dissolved or suspended in aqueous electrolytes for R from 10 to 95%, optimum results take place when R exceeds 95%.

For purposes of the present invention expressions like "halogenated carbon compounds" with respect to the waste materials disclosed and claimed herein are intended to mean principally halogenated carbon compounds capable of undergoing nucleophilic substitution and containing at least one halogen atom, comprising such priority pollutants as chloromethane, methylene chloride, chloroform, carbon tetrachloride, 1,1-dichloroethane, 1,2-dichloroethane, 1,1,1-trichloroethane, 1,1,2-trichloroethane, 1,1,1,2-tetrachloroethane, 1,1,2,2-tetrachloroethane, pentachloroethane, hexachloroethane, 1,2-dichloropropane, 1,3-dichloropropane, bromomethane, bromodichloromethane, 1,1-dichloroethylene, 1,2-dichloroethylene, cis-1,2-dichloroethylene, trans-1,2-dichloroethylene, trichloroethylene, tetrachloroethylene, 1,3-dichloropropene, chlorinated benzenes, 2-chlorotoluene, 2-chloro-p-xylene, polyhalogenated fluorocarbon refrigerants, polychlorinated biphenyls, halogenated phenols, insecticides, such as DDT, dimethoxy diphenyl trichloroethane (methoxychlor), hexachlorocyclohexane (BHC), and the gamma isomer thereof which is sometimes referred to as "Lindane", octachlorohexahydromethanoindene (Chlordane), and the like.

It must be understood that cathodes according to the invention must contain a coat of ion exchange material in contact with the superoxide catalyst and in contact with the aqueous electrolyte. Surprisingly, the chemical composition of the ion exchange material is extremely broad. Preferred materials form coats of high covering power, are chemically stable in the face of superoxide ion attack, allow ready diffusion of reactants and products between the oxygenated waste stream and the surface of the superoxide catalyst, are easy to apply, are mechanically stable during hydration and dehydration, and are inexpensive. Compositions whose microstructures comprise clusters of ions and water contained in an inert, hydrophobic matrix are preferred. Especially preferred is perfluorocarbon cation exchange membrane which is sold under the trade name, "NAFION", by Du Pont. It is generally accepted that in Nafion's structure, polymeric ions and water are clustered and separated from the surrounding hydrophobic fluorocarbon matrix. Nafion's microstructure consists of clusters of sulfonic ions and water (dimensions of about 50 A) connected by short, narrow channels (dimensions of about 10 A). In the cathodes according to the invention, the compounds(s) which form(s) the superoxide catalyst in contact with the substrate is (are) advantageously deposited in a quantity representing from 0.2 to 5 mg/cm$^2$. Likewise, the compound(s) which form(s) the ion exchange material coat in contact with the electrolyte is (are) deposited in a quantity representing 1 to 15 mg cm$^2$.

The material which forms the substrate may be chosen from any electrically conducting materials. It may be advantageously chosen from the group consisting of nickel, nickel plated graphite, stainless steel, mild steel, titanium, and electrochemically corrosion resistant carbon, without this being limiting.

The substrate may be in the form of a plate, sheet, lattice, cloth, felt, metal sheeting or expanded metal, or grids, it being possible for said materials to be planar or cylindrical shape or any other shape depending on the technology employed or use intended. Especially advantageous are substrate structures which are porous. The geometry of porous cathodes, particularly felts, cloths, sinters, etc., is three dimensional meaning structures having more than simply length and width, but also depth. That is, because the porous cathodes have internal working surfaces in contact with electrolyte, mass transfer is improved and the cell can operate at higher current densities without evolving hydrogen.

The invention also relates to a process for the use of these cathodes in the treatment of aqueous wastes. More particularly, halogenated carbon wastes are introduced into an electrolysis cell that contains water as well as small levels of ionic materials. With the cathode saturated with air or oxygen, the cathode potential is set at about $-1.0$V vs saturated calomel electrode (SCE) to generate superoxide and hydroxyl ions.

No representations are made herein as to any particular mechanism or other manner by which the present invention works. There are different ways in which one compound may theoretically stabilize another compound against chemical reaction. There are different ways in which superoxide when exposed to water and halogenated carbon wastes may theoretically react with water or with the waste. Investigations which we have conducted have failed to establish any particular mechanism. It was ascertained in our studies that the layer of ion exchange material in contact with the electrolyte and the superoxide catalyst must have high covering power There appears to be little doubt but that this capability contributes and/or is related to at least part of the effectiveness of the cathode of this invention. It was further ascertained in our studies of the process for degrading halogenated carbon compounds that the presence of effective amounts of superoxide catalyst protected from aqueous electrolyte by ion exchange layers of high covering power are necessary and sufficient to degrade halogenated carbon compounds. The lifetime of superoxide in 2M sodium hydroxide at 20° C. is quite long (around 200s). The ion exchange materials illustrating this invention all have well-known ability to increase pH adjacent to working cathodes. However, as indicated, we are not at this time prepared to judge or explain the present invention solely in terms of these capabilities of this protective layer.

The present invention is now illustrated in greater detail by way of the following examples, but it should be understood that the present invention is not limited thereto.

EXAMPLE 1

An electrolytic cell for the dehalogenation process may be set up as follows:

A glass beaker is used having a total capacity of 100 ml. The beaker is equipped with an air bubbler and a durable titanium anode formed from commercially available titanium foil having a length of 100 mm, a width of 50 mm, and a thickness of 0.6 mm and coated according to the procedures found in EXAMPLE 1 of U.S. Pat. No. 4,765,875. The cathode is comprised of an electrically conductive substrate, an intermediate layer of superoxide catalyst, and an outer layer of ion exchange material. The voltage of the cathode is measured with respect to a saturated calomel electrode (SCE, Ingold Model 5502-01). The process may also be conducted without such reference electrode.

Dechlorination of hexachlorobenzene is recognized by those of ordinary skill to be very difficult under mild conditions and representative of the more general process of dehalogenation of aromatic and aliphatic structures. To form representative halogenated carbon waste, 0.1M potassium sulfate in water is mixed with solid hexachlorobenzene and the slurry heated to 40° C. Cooling to room temperature results in a solution which is saturated in hexachlorobenzene. After filtering out any residual solid material, the aqueous waste solution is poured into the electrolytic cell for treatment.

Treatment of aqueous waste involves connecting the anode and cathode to a power supply. The voltage is increased so as to generate superoxide at the cathode. We have determined that about $-0.75$ Volts versus SCE is required and that approximately $-1.0$ to $-1.4$V vs SCE is optimum. More negative voltages result in hydrogen evolution which represents an undesirable parasite reaction.

The cell is operated with the cathode held at $-1.4$V v SCE for 24 hours, and the electrolyte analyzed by gas chromatography and ultraviolet spectroscopy. The hexachlorobenzene level is less than 1% of the original level. Titration of the electrolyte for chloride ion using the procedure found in Example 1 of U.S. Pat. No. 4,410,402 allows calculation of the yield of chloride ion. The yield is about 5 moles of chloride per mole of hexachlorobenzene which represents an 83% conversion of hexachlorobenzene.

Electroxidative Hexachlorobenzene Decomposition Results: Small Scale Cell

| Carbon Type | Special Conditions | Catalyst | Ion Exchange Polymer | % Disappearance in 24 hours |
| --- | --- | --- | --- | --- |
| PWB-6 | | none | none | 0 |
| | no power | Co(CH$_3$O)$_4$TPP | Nafion TM | 20% |
| | | none | Nafion TM | 25% |

-continued

Electroxidative Hexachlorobenzene Decomposition Results: Small Scale Cell

| Carbon Type | Special Conditions | Catalyst | Ion Exchange Polymer | % Disappearance in 24 hours |
|---|---|---|---|---|
|  |  | Co(CH$_3$O)$_4$TPP | none | 0 |
|  | no oxygen | Co(CH$_3$O)$_4$TPP | Nafion ™ | 20% |
|  |  | Co(CH$_3$O)$_4$TPP | Nafion ™ | 100% |

Table Codes:
Co(CH$_3$O)$_4$TPP = Cobalt(III) tetra(4-methoxyphenyl) porphyrin
FePc = Fe(III) phthalocyanine
Ru(bipyridyl)$_3$Cl = Ru(III) trisbipyridyl chloride
PWB-6 = carbon cloth electrode substrate,
Nafion ™ is a sulfonated polytetrafluoroethylene available from the DuPont corporation.

EXAMPLE 1A

Experiments described in Example 1 were repeated without employing one of the following conditions: electric power, oxygen, ion exchange layer, superoxide catalyst. In each case, analyses of the electrolyte indicated that the process in the absence of any one of these four conditions fails within measuring errors to degrade the hexachlorobenzene in 24 hours.

Table I illustrates comparative treatments of 0.1M potassium sulfate is distilled water saturated with hexachlorobenzene. In this test solution, water level exceeds 98 percent by volume and hexachlorobenzene concentration is about 500 parts per million at room temperature. Tests 1 through 5 are controls. Test 6 illustrates the invention for an electrically conductive substrate which has low surface area. Tests 7 and 8 illustrate the novel process for degrading halogenated carbon compounds in aqueous solvents for preferred choices of high-surface-area electrically conductive substrate, superoxide catalyst in coat a and ion exchange layer of high covering power in coat b.

| Test No. | Special Conditions | Electrically Conductive Substrate | Catalyst Coat a | Ion Exch. Layer Coat b | % Removed in 24 Hours |
|---|---|---|---|---|---|
| 1 | none | carbon cloth | none | none | none |
| 2 | none | carbon cloth | none | G | 20% |
| 3 | none | carbon cloth | A | none | none |
| 4 | no power | carbon cloth | A | G | 20% |
| 5 | no oxygen | carbon cloth | A | G | 20% |
| 6 | none | vitreous carbon | A | G | 80% |
| 7 | none | carbon cloth | A | G | 100% |
| 8 | none | carbon cloth | A | H | 100% |

In Table I, the carbon cloth is woven from high modulus graphite yarn (PWB-6, Zoltech Corp., Lowell, Mass. 01851). This cloth has a much higher surface area/geometric area than does the reticulated vitreous carbon that is available from Energy Research and Generation, Inc.. Catalyst A is coated over the electrically conductive substrate to form an intermediate layer (coat a) by solvent deposition from a saturated chloroform solution of cobalt (III) tetra(methoxyphenyl) porphrin (CoTMPP, Strem Chemical Co.) in loadings of about 0.10 mg/gram of substrate.

In Table I, ion-exchange coat G contains cation-exchange groups and ion-exchange coat H contains anion-exchange groups. Ion exchange coat G is formed by solvent casting a perfluorosulfonic acid membrane over coat a. Ion exchange coat H is formed by solvent casting a coat of polysulfone and long chain alkyl quarternary ammonium chloride over coat b. Procedures to achieve layers of G and H with high covering power are given in EXAMPLE 2.

EXAMPLE 1B

Experiments described in Example 1 were repeated except that each member of the following group was substituted for hexachlorobenzene: chloromethane, methylene chloride, chloroform, carbon tetrachloride, 1,1-dichloroethane, 1,2-dichloroethane, 1,1,1-trichloroethane, 1,1,2-trichloroethane, 1,1,1,2-tetrachloroethane, 1,1,2,2-tetrachloroethane, pentachloroethane, hexachloroethane, 1,2-dichloropropane, 1,3-dichloropropane, bromomethane, bromodichloromethane, 1,1-dichloroethylene, 1,2-dichloroethylene, cis-1,2-dichloroethylene, trans-1,2-dichloroethylene, trichloroethylene, tetrachloroethylene, 1,3-dichloropropene, chlorinated benzenes, 2-chlorotoluene, 2-chloro-p-xylene, polyhalogenated fluorocarbon refrigerants, polychlorinated biphenyls, halogenated phenols, insecticides, such as DDT, dimethoxy diphenyl trichloroethane (methoxychlor), hexachlorocyclohexane (BHC), and the gamma isomer thereof which is sometimes referred to as "Lindane", octachlorohexahydromethanoindene (Chlordane). In each of the more than thirty experiments, analysis of the electrolyte indicates that the process degrades over 90% of the starting material in 24 hours.

EXAMPLE 1C

Experiments described in Example 1 were repeated except that excess solid hexachlorobenzene was periodically added to the electrolyte to form a slurry. The cell is run for long periods of time. Regardless of the amount of hexachlorobenzene present initially, complete substrate disappearance is observed.

EXAMPLE 1D

Experiments described in Example 1 were repeated except that an emulsion of polychlorinated biphenyl oil was added to the electrolyte. The cell is run for long periods of time. Regardless of the amount of oil added, complete substrate disappearance is observed.

EXAMPLE 1E

Three experiments were conducted to further illustrate and quantitate the inhibiting effects of residual water on the performance of prior art means for the degradation of halogenated carbon compounds as well as the beneficial effect of employing the cathode of the present invention in wastes containing about 1% water.

A control was first tested using the experiments described in Example 1 but with a prior art cathode of platinum gauze was well as an aprotic solvent which was essentially free of water. The waste treated was 1 g of hexachlorobenzene dissolved in approximately 70 ml of a dry solution of the aprotic solvent dimethylformamide containing 0.1M tetraethylammonium perchlorate. The cell was run for 24 hours and over 99% of the hexachlorobenzene was decomposed. This experiment confirms the effectiveness of prior art processes for treating essentially dry solutions with conventional cathodes.

This control experiment was repeated except 1 ml or about 1% by volume of water was added to the approximately 70 ml of dry aprotic waste. The cell was run for 24 hours and none of the hexachlorobenzene was decomposed. This illustrates the complete failure of prior art methods to treat wastes containing about 1% levels of water.

The prior art platinum gauze cathode was then replaced by a cathode according to the invention and the experiments described in Example 1 repeated. After 24 hours, over 99% of the hexachlorobenzene was decomposed even though the electrolyte contained about 1% water. This illustrates the importance of using cathodes according to the invention for treating wastes containing more than approximately 1 volume percent water.

EXAMPLE 2

The method of forming the cathode is not particularly restricted, and any of known techniques, such as thermal decomposition, plating, electrochemical oxidation, powder sintering, solvent deposition, and the like, may be employed.

The electrically conductive substrate may be formed by the following process:

a) selection of a current collector. A suitable representative selection is selected from the group consisting of expanded metal foils (Product Code 3 SS 7-077 from Delker Corporation, Branford, Conn. 06405, a 0.07 mm thick stainless steel foil with approximately 50% open area), woven graphite cloth (PWB-6 from Zoltek Corporation, Lowell, Mass. 01852, high surface area cloth with approximately 22 mg/cm$^2$ of graphite), commercially pure titanium foil, reticulated vitreous carbon (Energy Research and Generation, Inc., Oakland, Calif.), and nickel-coated graphite fiber cloth (CYCOM ® NCG Fiber from American Cyanamid woven into a 5HS, 3K cloth by Textile Technologies, Hatboro, Pa. 19040).

b) increasing the surface area of the substrate when necessary. High surface area graphite cloths are used without further treatment. However, improved mass transfer results when materials of low surface area are roughened through surface treatment. Accordingly, metal substrates are first degreased with acetone, washed successively with hot acid solution and pure water, and dried to prepare an electrode substrate. Separately, a paste is prepared consisting of 1 gram of ruthenium chloride, $RuCl_3$; 3 ml of tetrabutyl-ortho-titanate; 7 ml of butanol; and 0.4 ml hydrochloric acid (36 percent). Initially, the butanol is added to the mixture of ruthenium chloride and hydrochloric acid with stirring until complete dissolution of the solids is accomplished. The tetrabutyl-ortho-titanate is then added with stirring to form a uniform paste which is brown and viscous. The paste next is painted onto the surface of the conductive substrate. The coated substrate is then dried by a stream of hot air at a temperature of approximately 200° C. and heated in air at approximately 500° C. for ten minutes. During such drying and heating, the solvent is evaporated and a coating of oxide crystals is formed on the surface of the substrate. The resulting surface possesses a relatively high surface area which is enhanced by the irregular surface morphology. This procedure may be repeated in order to form a final and complete and continuous coating of oxide crystals to form the electrically conductive substrate.

The electrically conductive substrate is coated with superoxide catalyst by processes which are chosen depending on the type of superoxide catalyst chosen as follows: a) organometallic catalysts. These are usually conveniently solvent deposited over the surface of the substrate.

Solvents suitable for use in the present invention may be easily determined by consulting a handbook of chemistry after an organometallic catalyst has been selected. For example, cobalt tetra(4-methoxyphenyl) porphyrin is very soluble in chloroform and is readily solvent deposited from chloroform solution. Ruthenium trisbipyridyl chloride is very soluble in isopropanol and is readily deposited therefrom. Cobalt tetraazaannulene is sparingly soluble in most solvents but is coated on to surfaces by painting a slurry of powder in 5 wt % polyvinyl alcohol in water on to the support followed by air drying and then heating in nitrogen to 500° C. Organometallic catalysts are advantageously deposited in a quantity from 0.2 to 5 mg cm$^2$ of geometric electrode area.

b) metal oxide catalysts. These are best deposited over the surface of the support by coating the surface with an aqueous solution of the metal nitrate(s), air drying, and then thermally decomposing the nitrate to form in situ the metal oxide. These steps are repeated at least four times to produce oxide coatings which are both adherent and of high surface area. Metal oxide catalysts are advantageously deposited in a quantity representing from 1 to 5 mg/cm$^2$ of geometric electrode area.

c) carbon catalysts. Oxygen reduction on carbon/graphite ordinarily involves a strong interaction of oxygen with the functional groups on the surface. Surface quinone groups are beneficial for the generation of superoxide and are generated directly on a carbon/graphite electrically conductive substrate by oxidizing the surface with chemical treatments (e.g., soaking in concentrated nitric acid or by heating the carbon for one hour at 500° C. in air). Alternatively, useful carbon superoxide catalysts can be thermally decomposed on to electrically conductive supports by dissolving nitrogen containing polymers in suitable solvents, coating the support with said solution, drying to remove the solvent, and then heat treating at high temperature under inert gas. By way of example but not by way of limitation, polyacrylonitrile (Aldrich Chemical Company, molecular weight 150,000) is dissolved in dimethylformamide to form a 5 wt % solution. A porous cobalt-plated nickel substrate is coated, dried at 80° C. to remove the solvent, and then heated under nitrogen for thirty minutes at 700° C. The resulting carbon catalyst has a loading of approximately 0.2 mg/cm$^2$ of actual surface area.

The superoxide catalyst is according to this invention coated with a membrane of high covering power. Persons skilled in the art will appreciate that such coatings can be produced by electropolymerization; by solvent casting polymer films followed by chemical treatments to produce combinations of porosity and ionic groups; by solvent casting film forming ion exchange materials; and the like. By way of example but not by way of limitation, suitable cation-exchanging coatings are prepared from commercially available solution of Nafion ® 117 in ethanol/water (5% solution, Aldrich Chemical Co.). Nafion ® is a perfluorosulfonic acid membrane composed of polytetrafluoroethylene backbone and pendant side chains terminated with sulfonic acid groups. The supported superoxide catalyst is dip coated with the solution, air dried, and then heated in air for five minutes at 95° C. to dehydrate the Nafion ® and convert it into a water insoluble membrane. Alternatively, suitable anion-exchange coatings are prepared from a solution formed by dissolving 1 w % long chain alkyl quaternary ammonium chloride (Aliquat 336 ®, Aldrich Chemical Co.) and 10 wt % polysulfone into tetrahydrofuran. The supported superoxide catalyst is dip coated with solution, air dried and then boiled in water. It will be readily apparent to persons skilled in the art that during the degradation process the chemical composition of the membrane will change as the bound ionic groups form salts with the ions found in the electrolyte and with ions which are products of degradation. We have found that these changes do not alter the beneficial effect of the bound ionic groups.

EXAMPLE 3

This example illustrates the types of superoxide catalysts suitable for forming coat a of this invention. Cathodes were formed according to this invention from graphite cloth (PWB-6 from Zoltek Corporation, Lowell, Mass. 01852). This cloth was coated with the various catalysts to form coat a. Coat a was then covered by the procedures in EXAMPLE 2 with a layer of ion-exchange material (G or H of EXAMPLE 1A). These cathodes were used to study the dechlorination of hexachlorobenzene using the methods of EXAMPLE 1. The results are shown in Table II.

TABLE II

| Test No. | Catalyst in Coat a | Ion-Exchange Polymer in Coat b | % Removal |
|---|---|---|---|
| 9 | Electrodeposited Pt | G | 0 |
| 10 | Electrodeposited Ag | G | 0 |
| 11 | Lead ruthenate | G | 0 |
| 12 | Iron(III) phthalocyanine | G | 55 |
| 13 | Ru(III) trisbipyridyl Cl | G | 85 |
| 14 | Iron(III) phthalocyanine | H | 80 |
| 15 | Graphite oxidized in $HNO_3$ | G | 40 |
| 16 | Cobalt(III) tetraazaannulene | G | 100 |
| 17 | NiCo spinel | G | 100 |

Tests 9, 10 and 11 are controls. They illustrate that catalysts which are know not to produce superoxide ions at −1.4V vs SCE are also ineffective for the treatment of dilute aqueous wastes.

Tests 12 through 17 illustrate the broad range of superoxide catalysts useful for practicing the process of this invention.

For purposes of this invention, the term "halogen" is intended to mean principally chloro, bromo, and iodo, and, in some instances, fluoro. Accordingly, "degrading halogenated carbon compounds" means the removal of at least one halogen from a mono or polyhalogenated carbon compound.

While only a limited number of embodiments of the present invention are disclosed and described herein, it will be readily apparent to persons skilled in the art that numerous changes and modifications may be made without departing from the scope of the invention. Accordingly, the foregoing disclosure and description thereof are for illustrative purposes only and do not in any way limit the invention which is defined only by the claims which follow.

What is claimed is:

1. In a process for degrading wastes comprising one or more halogenated carbon compounds by the steps of providing an electrolyte cell comprising an anode, a cathode, and a source of oxygen, and impressing a voltage across said anode and cathode sufficient to reduce said oxygen at said cathode to superoxide ion, wherein the improvement comprises degrading said halogenated carbon compounds in an electrolyte comprising by volume from about 1 to 99 percent water by contacting said electrolyte with said cathode which consists essentially of an electrically conducting substrate and a heterogeneous coating said coating of which completely covers the surface of said substrate comprising two coats a and b, coat a is in contact with said substrate and containing superoxide catalyst and coat b is in contact with the electrolyte and with covering power for coat a and comprising ion exchange material.

2. The degradation process of claim 1 wherein said halogenated carbon compound reacts with superoxide ion which is electrolytically generated by the reduction of said oxygen on said superoxide catalyst.

3. The degradation process of claim 1 wherein the covering power of coat b is approximately greater than 95%

4. The degradation process of claim 1 wherein said source of oxygen is air.

5. The degradation process of claim 1 wherein said halogenated carbon compound is selected from the group consisting of chloromethane, methylene chloride, chloroform, carbon tetrachloride, 1,1-dichloroethane, 1,2-dichloroethane, 1,1,1-trichloroethane, 1,1,2-trichloromethane, 1,1,1,2-tetrachloroethane, 1,1,2,2-tetrachloroethane, pentachloroethane, hexachloroethane, 1,2-dichloropropane, 1,3-dichloropropane, bromomethane, bromodichloromethane, dichloroethylene, 1,2-dichloroethylene, cis-1,2-dichloroethylene, trans-1,2-dichloroethylene, trichloroethylene, tetrachloroethylene, 1,3-dichloropropene, chlorinated benzenes, b 2-chlorotoluene, 2-chloro-p-xylene, polyhalogenated fluorocarbon refrigerants, polychlorinated biphenyls, halogenated phenols, insecticides, such as DDT, dimethoxy diphenyl trichloroethane, hexachlorocyclohexane, the gamma isomer of hexachlorocyclohexane, and octachlorohexahydromethanoindene.

6. The degradation process of claim 1 wherein said electrolyte is a slurry and comprises a solid halogenated carbon compound.

7. The degradation process of claim 1 wherein said electrolyte is an emulsion and comprises a liquid halogenated carbon compound.

8. The degradation process of claim 1 wherein said ion exchange material is selected from the group consisting of poly- tetrafluoroethylene modified by pendant side-chains terminated by sulfonic acid groups; polysulfone containing long chain alkyl quarternary ammonium hydroxide; and salts thereof.

9. The degradation process of claim 1 wherein said superoxide catalyst is selected from the group consisting of carbon, graphite, oxidized carbon, oxidized graphite, cobalt tetraazaannulene, cobalt tetra methoxyphenyl porphyrin and ruthenium trisbipyridyl.

10. A cathode for the degradation of halogenated carbon compounds in aqueous solution comprising an electrode made of a conductive material having coated thereon: an inner layer comprised of between 0.2 to 5 $mg/cm^2$ of at least one electrode active substance with electrochemical activity for the reduction of oxygen to superoxide ion; an outer layer of high covering power comprised of between 1 to 15 $mg/cm^2$ of ion exchange material.

11. The process for protecting superoxide ion from decomposition by water comprising electrolytically forming superoxide on a cathode coating with a layer of high covering power comprised of between 1 to 15 $mg/cm^2$ of ion exchange material.

* * * * *